United States Patent
Sullivan et al.

(10) Patent No.: US 6,889,146 B2
(45) Date of Patent: May 3, 2005

(54) SEAT BELT TENSION DETERMINATION USING MULTIPLE BELT TENSION SENSORS

(75) Inventors: Stuart S. Sullivan, Peru, IN (US); Morgan D. Murphy, Kokomo, IN (US); James F. Patterson, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/653,463

(22) Filed: Sep. 2, 2003

(65) Prior Publication Data

US 2004/0079176 A1 Apr. 29, 2004

Related U.S. Application Data

(60) Provisional application No. 60/408,039, filed on Sep. 4, 2002.

(51) Int. Cl.$^7$ ................ G01L 1/00; G01L 1/26
(52) U.S. Cl. .............. 702/43; 702/42; 73/862.391
(58) Field of Search ............... 702/41, 42, 43; 73/826, 862.3, 862.391

(56) References Cited

U.S. PATENT DOCUMENTS 4,934,814 A * 6/1990 Scholz ............... 356/430
6,502,860 B1   1/2003 Siegfried et al.
6,554,318 B2   4/2003 Kohut et al.
6,605,877 B1   8/2003 Patterson et al.
6,636,792 B2 * 10/2003 Lichtinger et al. ........ 701/45
2004/0017073 A1 * 1/2004 Pavlov et al. ............ 280/806

* cited by examiner

Primary Examiner—Bryan Bui
Assistant Examiner—Meagan S Walling
(74) Attorney, Agent, or Firm—Stefan V. Chmielewski

(57) ABSTRACT

A vehicle seat belt is provided with multiple seat belt tension sensors providing output signals that are received and averaged. Signals having values outside a band around the average are dynamically tested against a signal from an occupant weight sensor, vertical seat accelerometer or other sensor indicating expected vertical acceleration of an occupant restrained by the seat belt. This test provides variance values and time-averaged values of each signal, derives a reference value for each signal and compares the variance value for each signal to its reference value. If the comparisons indicate that the dynamic variance of the signals is significantly different, the signal is declared invalid and the average value is recalculated without the invalid signal. The final average signal after removal of all invalid signals determines the belt tension value, which may be used to compensate a weight sensor signal in an occupant characterization system to help control deployment of a vehicle airbag.

36 Claims, 15 Drawing Sheets

SEAT BELT TENSION DETERMINATION USING MULTIPLE BELT TENSION SENSORS

RELATED APPLICATIONS

This application claims the benefit of U.S. Provisional Application No. 60/408,039, filed Sep. 4, 2002 and is related to U.S. patent application Ser. No. 10/653,698, entitled Vehicle Seat Occupant Status Classification Using Multiple Sensors, and filed on the same day as this application.

TECHNICAL FIELD

The technical field of this invention is vehicle occupant restraint systems.

BACKGROUND OF THE INVENTION

Vehicle restraint deployment controls are increasing in ability to classify vehicle seat occupants on the basis of sensed occupant characteristics such as weight and determine and/or adjust deployment on the basis of such classification. To accurately determine vehicle seat occupant weight, such systems may compensate a vehicle seat occupant weight signal, derived from a suitable occupant weight sensor, in response to a belt tension sensor, in order to remove inaccuracies caused by the downward force of a tightly cinched seat belt on the seat occupant. But such compensation may itself be inaccurate if the seat belt is pinched or snagged between the tension sensor and the occupant so that the belt tension sensor signal from the belt tension sensor does not represent the true downward force of the belt on the occupant.

For example, referring to FIG. 1, a prior art vehicle seat apparatus 10 comprises a seat frame 12 and a seat cushion 14. A pressure sensor 16 is disposed to sense the pressure of a mass 18 such as an occupant or an object on seat cushion 14, the sensor being located, for example, between seat cushion 14 and seat frame 12. Seat 10 is provided with a seat belt apparatus comprising a flexible restraining belt generally indicated as 20 and extending between a latch side anchor 30 and an opposite side anchor 32. A first section 22 of belt 20 extends between anchor 30 and a latch portion 25. The remainder of belt 20 is a single, separate piece with three continuous sections: (1) section 28 between latch portion 24 and a retractor 38 typically anchored on the "B" pillar of the vehicle on the opposite side (outside) from the latch, (2) section 27 between latch portion 24 and an object 34 pinching or kinking the belt, and (3) section 26 between object 34 and anchor 32. During the operation of this invention latch portions 24 and 25 will be latched together into a single latch 24, 25. In many applications, the belt is slidable through latch portion 24; and the relative lengths of sections 27 and 28 will change as the belt so slides. Alternatively, each of sections 27 and 28 may be separately attached to latch portion 24. At the end of belt 20 opposite latch 24, 25, a belt tension sensor 36 is disposed between the end of belt 20 and anchor 32. Anchors 30 and 32 are firmly attached to the vehicle body to restrain mass 18 against seat cushion 14 in a vehicle crash as is well known in the art.

Latch 24, 25 allows unfastening of the two separable parts—22 and 26, 27, 28—of belt 20 for occupant ingress and egress; but while latch 24, 25 is latched, belt 20 is capable of maintaining a sustained tension force having a downward component on restrained mass 18 and thus distorting the pressure sensed by pressure sensor 16. Belt tension sensor 36 provides a signal of belt tension force to a control also receiving an occupant weight signal from pressure sensor 16 so that the occupant weight signal may be compensated by the belt tension to more accurately and dependably estimate the weight of occupant (restrained mass) 18 on seat cushion 14. The estimated weight is used to characterize the occupant of the seat in order to control the deployment of an airbag or similar passive restraint during a vehicle crash event. But belt tension sensor 36 itself can be fooled by an object 34 that pinches or kinks belt 20 and thus changes the tension on the side of the belt—section 26 in this example—adjacent the belt tension sensor. For example, in the apparatus as shown, belt tension sensor 36 provides a signal of the tension in section 26 of the belt, between anchor 32 and object 34, that may not be the same as the tension in section 27 of the belt adjacent restrained mass 18, due to the interference of object 34.

A similar prior art apparatus is shown in FIG. 2, with similar elements having identical reference numerals. The differences are: (1) belt tension sensor 36 is on the opposite side of seat cushion 14, between anchor 30 and belt section 22; (2) object 34 is also on the opposite side of seat cushion 14, although it is on the same side of latch portion 24 and is interfering with section 27, 28 of belt 20; and (3) the proportion of section 27 to section 28 of belt 20 in this example is different from that of section 27 to section 28 of the belt of FIG. 1, due to the different location of object 34. The same problem occurs with respect to object 34, which prevents belt tension sensor 36 from accurately sensing the tension force in belt 20 that affects the output of pressure sensor 16; and this problem would also be present if object 34 were interfering with section 22 of the belt. The problem is the same, but the side is different.

SUMMARY OF THE INVENTION

This invention derives a seat belt tension value for a vehicle seat belt exerting a downward force on a seat occupant in response to a received plurality of seat belt tension signals representing tensile forces in different locations within the seat belt. Preferably, the invention derives an average seat belt tension value from an average value of those seat belt tension signals found to be valid in a dynamic diagnostic test. The test, during a predetermined period, derives a seat belt tension variance measure and a time-averaged seat belt tension value from selected seat belt tension signals and derives a vertical acceleration variance measure and a time-averaged vertical acceleration value from a received signal indicative of expected vertical acceleration of the seat occupant. The test further derives a seat belt tension reference value at least from the time-averaged seat belt tension value and derives a vertical acceleration reference value at least from the time-averaged vertical acceleration value. The seat belt reference value represents a greater proportionate variance from the time-averaged seat belt tension value than a proportionate variance from the time-averaged vertical acceleration value represented by the vertical acceleration reference value. The test finally determines invalidity of the selected seat belt tension signal if the seat belt tension signal variance measure exceeds the seat belt tension reference value and the vertical acceleration reference value exceeds the vertical acceleration variance measure.

In this manner, a signal from a stuck or inoperative seat belt tension sensor, or a signal from an operative seat belt tension sensor responding to tension in a portion of the belt that is jammed, kinked or otherwise unable to accurately indicate a belt tension providing a downward force on a vehicle seat occupant may be automatically removed from consideration in determining that belt tension. The accurate value of belt tension thus provided can more accurately compensate a weight determination of the seat occupant for proper occupant characterization in controlling vehicle airbag deployment.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 3:
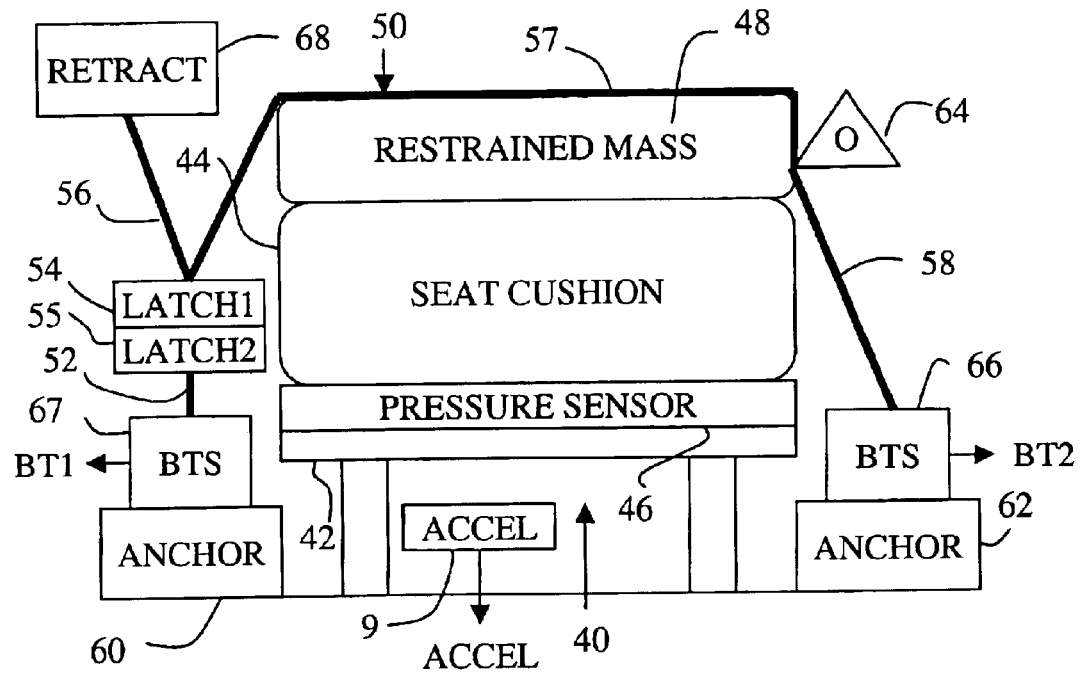
FIG. 3 shows a preferred embodiment of apparatus according to this invention for sensing the weight of a mass on a vehicle seat cushion.
Figure 11:
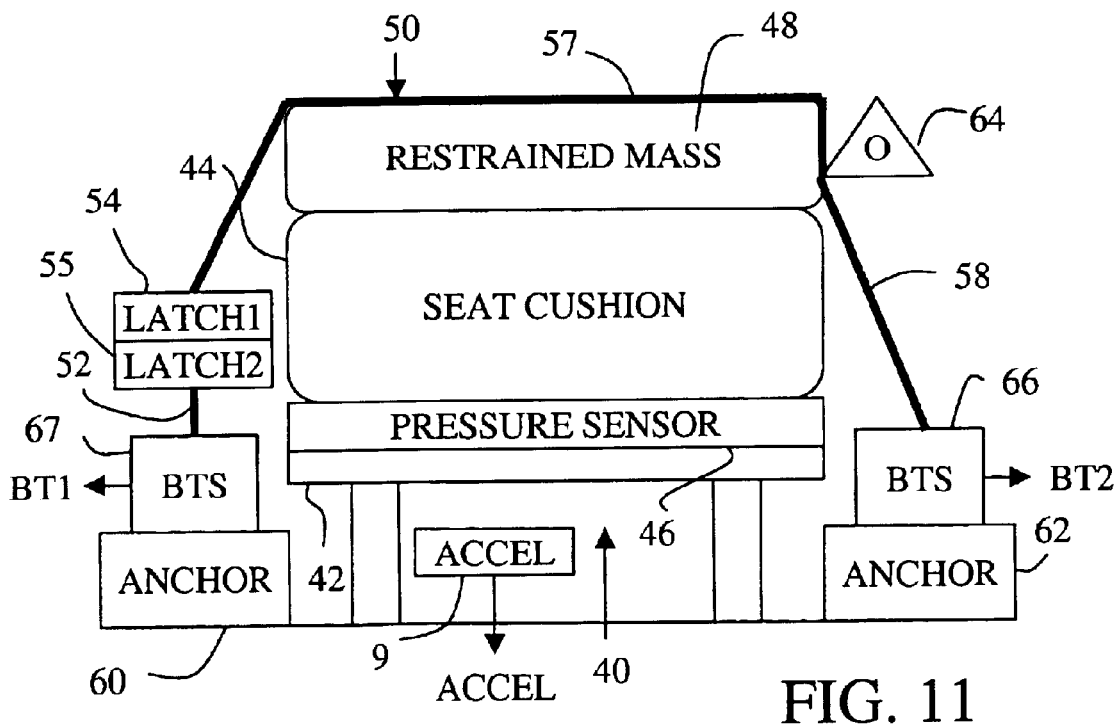
FIG. 11 shows an alternative embodiment of the invention in which the belt has no shoulder portion and retractor.

FIG. 3 shows an apparatus according to this invention. Vehicle seat apparatus 40 comprises a seat frame 42 and a seat cushion 44. A pressure sensor 46 is disposed to sense the pressure of a mass 48 such as an occupant or an object on seat cushion 44, for example being located between seat cushion 44 and seat frame 42. Seat 40 is provided with a seat belt apparatus comprising a flexible restraining belt generally indicated as 50 and extending between a latch side anchor 60 and an opposite side anchor 62. A first section 52 of belt 50 extends between anchor 60 and a latch portion 55. The remainder of belt is a single, separate piece with three continuous sections: (1) section 56 between latch portion 54 and a retractor 68 typically anchored on the "B" pillar of the vehicle on the opposite side (outside) from the latch, (2) section 57 between latch portion 54 and an object 64 pinching or kinking the belt, and (3) section 58 between object 64 and anchor 62. During the operation of this invention latch portions 54 and 55 will be latched together into a single latch 54, 55. In many applications, the belt is slidable through latch portion 54; and the relative lengths of sections 56 and 57 will change as the belt so slides. Alternatively, each of sections 56 and 57 may be separately attached to latch portion 54. At the end of belt 50 opposite latch portion 54, 55, a belt tension sensor 66 is disposed between the end of belt section 58 and anchor 62. Another belt tension sensor 67 is disposed between the end of belt section 52 and anchor 60. Anchors 60 and 62 are firmly attached to the vehicle body or seat frame to restrain mass 48 against seat cushion 44 in a vehicle crash as is well known in the art. Sensors 66 and 67 provide output seat belt tension signals BT1 and BT2, respectively. If desired, more belt tension sensors may be provided, for example incorporated in latch 54, 55 or affixed to a section of the belt in a belt strain gauge configuration. FIG. 11 shows an apparatus identical to that of FIG. 3 described above except that it includes no retractor 68 or section 56 of belt 50.

Figure 1:
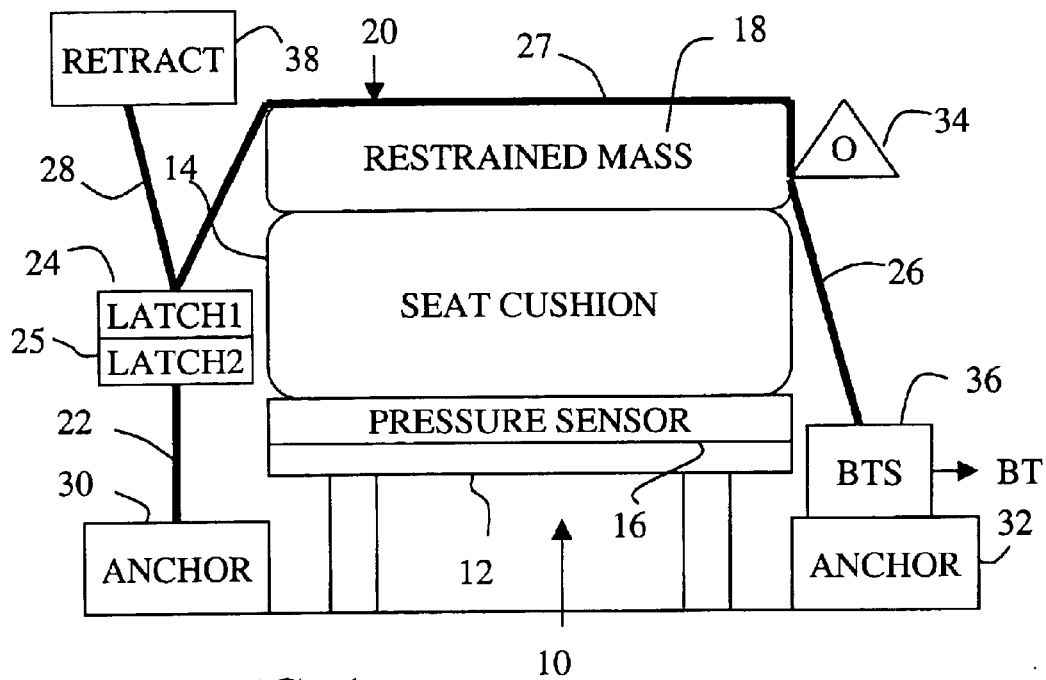
FIGS. 1 and 2 show prior art apparatus for sensing the weight of a mass on a vehicle seat cushion.
Figure 2:
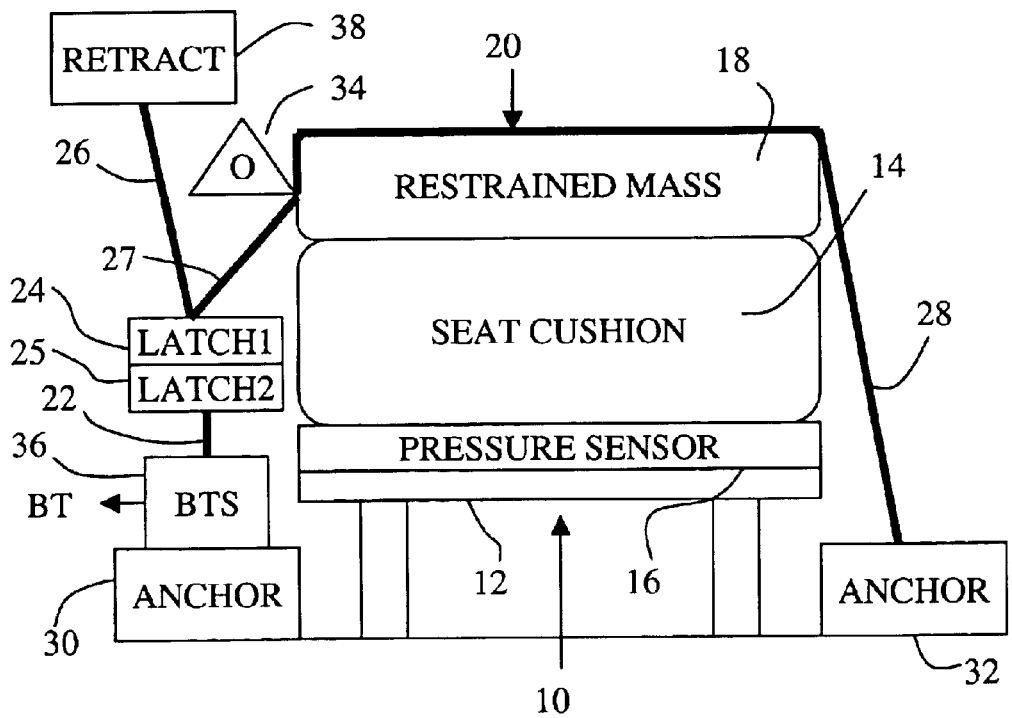

The apparatus described in the preceding paragraph is similar to that of the prior art shown in FIG. 1 in many ways; but the invention adds at least a second belt tension sensor 67 to the belt 50. The two belt tension sensors 66 and 67 are placed on opposite sides of the likely location of an object 64 interfering with belt 50; and the result is that the signals from the two sensors, when processed as described below, will in many cases provide information sufficient to properly compensate the output of pressure sensor 46 to accurately indicate the weight of restrained mass 48 on seat cushion 44 and thus allow accurate occupant status determination for seat 40. The use of a third or even more sensors may increase the probability of such accuracy, at the expense of greater cost.

Figure 4:
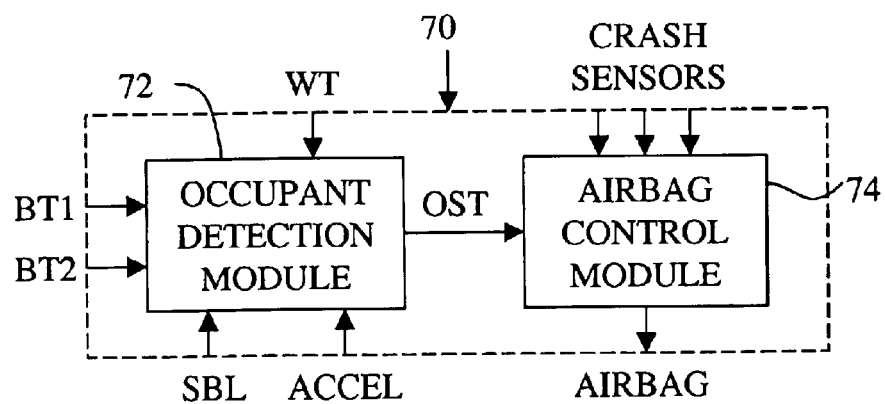
FIG. 4 shows a block diagram of a control for a vehicle passive restraint system including apparatus according to this invention.

The processing of the belt tension signals is performed in a controller 70 shown in FIG. 4. Controller 70 comprises an occupant detection module 72 and an airbag control module 74. Occupant detection module 72 receives signals BT1 and BT2 from belt tension sensors 67 and 66, respectively, along with any other belt tension signals, signal WT from pressure sensor 46 and, optionally, a seat belt latch signal SBL from latch 55 of belt 50, the latter signal indicating whether latch portions 54 and 55 are latched together. Module 72 outputs an occupant status signal OST to airbag control module 74. Airbag control module 74 receives the occupant status signal OST from module 72 along with signals from various crash sensors and outputs deployment control signals to at least one passive restraint such as an airbag, not shown. Each of modules 72 and 74 may be a programmed digital computer of standard and appropriate construction; or alternatively, the two modules may be software modules programmed into a single digital computer.

The main relevant portion of the program of occupant detection module 72 incorporating this invention is entitled BTS COMPENSATION and is described with reference to FIGS. 5A–5C. Starting in FIG. 5A, the routine begins at step 100 by sampling the signals BT1, BT2 . . . BTN from the belt tension sensors. In the embodiment shown there are only two such sensors, but the method of the apparatus is applicable to a greater plurality "N" of sensors that are properly disposed in the apparatus and is shown in a general format for any number. At step 102 the routine sets a counter value BTSCOUNT to the number N of the plurality of signals sampled. At step 104 the routine checks to see if any of the N sensors is invalid, due to having a diagnostic fault (determined and flagged by other diagnostic routines not shown) or being associated with an unlatched seat belt, as indicated by signal SBL. If the answer is no, the routine proceeds via tab A to step 108 in FIG. 5B, wherein it determines if a pressure signal value, derived from the output signal WT of pressure sensor 46, is greater than a STATUS 1 (typically "allow") threshold plus a constant reference BTSCOMPMAX, the latter representing an increase over the STATUS 1 threshold such that it makes no difference what the belt tension is, relevant to a decision of whether or not to perform the deployment action assigned to STATUS 1. If the answer is YES, there is no need for the compensation of this invention; and the routine proceeds to step 110, at which an occupant characterization of STATUS 1 is generated to be delivered to airbag control module 74, wherein it will, for example, permit the deployment of the passive restraint based on sensed occupant status. After step 110, the routine sets a NO COMPENSATION flag at step 112 and exits. But if the determination at step 108 is NO, the routine alternatively proceeds to step 114, at which it determines if a pressure signal value, derived from the output signal of pressure sensor 46, is less than a STATUS 2 threshold minus constant reference BTSCOMPMAX, the value of the STATUS 2 threshold being less than that of the STATUS 1 threshold and the value of BTSCOMPMAX representing a decrease under the STATUS 2 threshold such that it makes no difference what the belt tension is, relevant to a decision of whether or not to perform the deployment action assigned to STATUS 2. If the answer is YES, there is no need for the compensation of this invention; and the routine proceeds to step 116, at which an occupant characterization of STATUS 2 is generated to be delivered to airbag control module 74, for example to suppress deployment of the passive restraint based on sensed occupant status. After step 116, the routine sets the NO COMPENSATION flag at step 112 and exits. Returning to step 114, if the answer is NO, the relative pressure value is thus within a band between STATUS 1 THRESH+BTSCOMPMAX and STATUS 2 THRESH−BTSCOMPMAX; and the routine averages the BTS signal values ($BTS_n$, for n=1, 2 ... N) at step 118 to produce an average seat belt tension value $BTS_{AVG}$.

In this embodiment, the process described in the previous paragraph is set up to eliminate wasteful processing and computation time in the derivation of the belt tension compensated occupant weight signal that is not needed in the process following that of this invention. STATUS 1 THRESH might typically be an actual deploy threshold level for sensed occupant weight, and BTSCOMPMAX may be set equal to the largest value of PCOMP in the belt tension compensation look-up table. Thus the comparison of step 108 in this embodiment is related directly to the actual deploy threshold of the following process. But the STATUS 2 THRESH value is not necessarily directly related to any second or other threshold in the following process. Rather, it is calibrated for this process, relative to STATUS 1 THRESH and the value of BTSCOMPMAX, to create a desired band of relative pressure values for which the belt tension compensation determination will be performed. In effect, the band may be made unsymmetrical about STATUS 1 THRESH, extending further on the low side than the upper side.

Figure 5A:
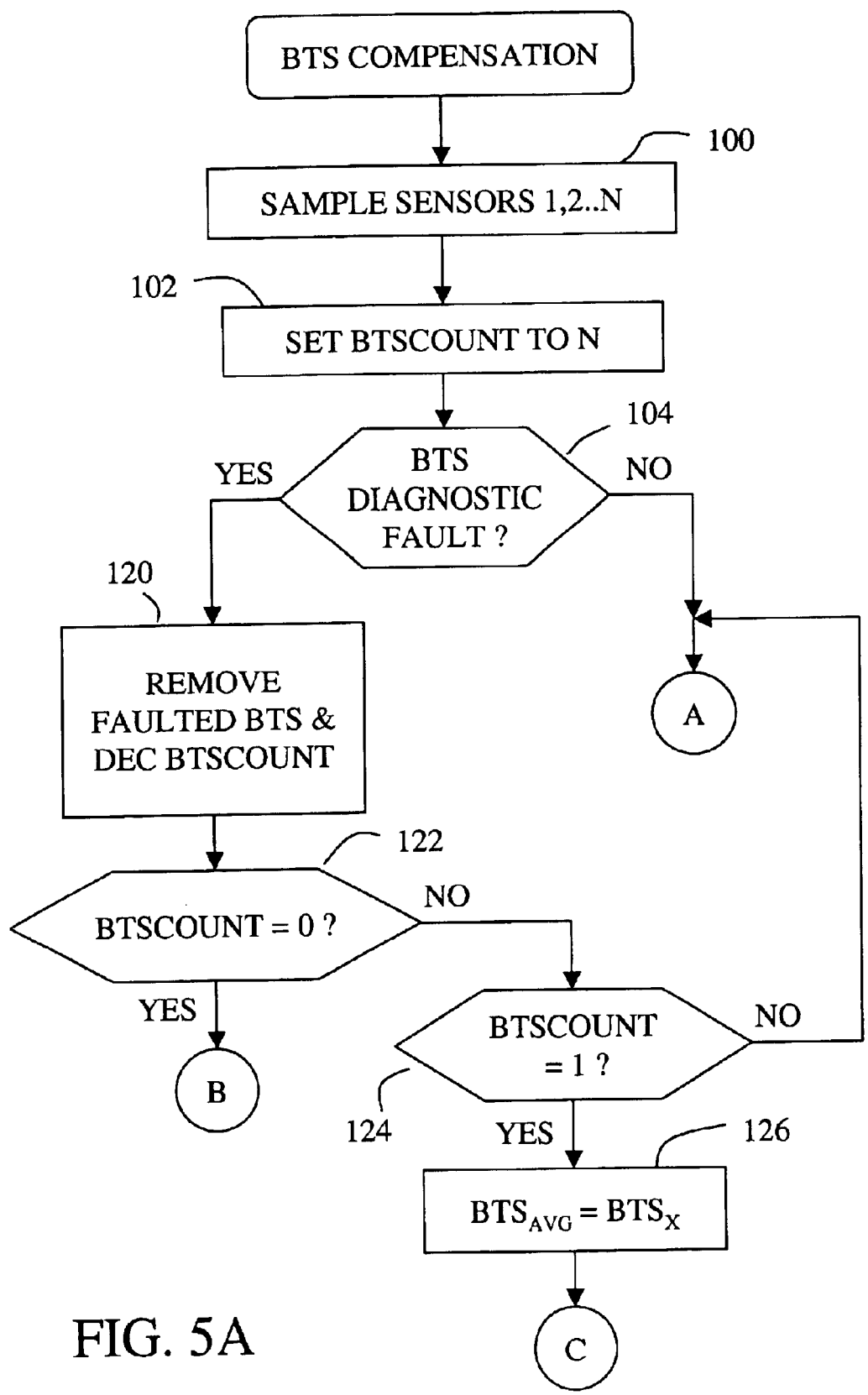
FIGS. 5A–5C, 6, 7A–7C and 8 show flow charts illustrating the operation of a preferred embodiment this invention.
Figure 5B:
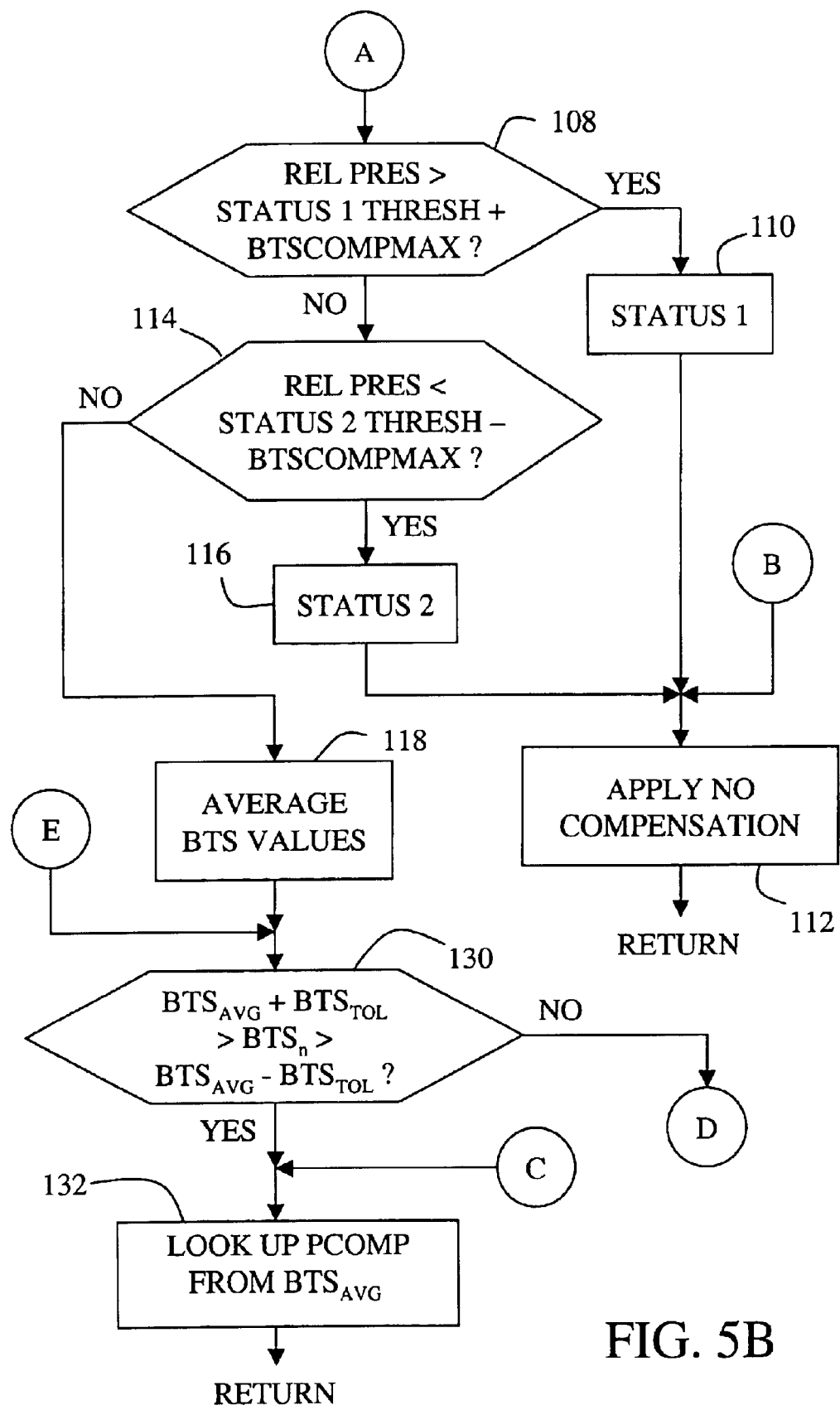
Figure 5C:
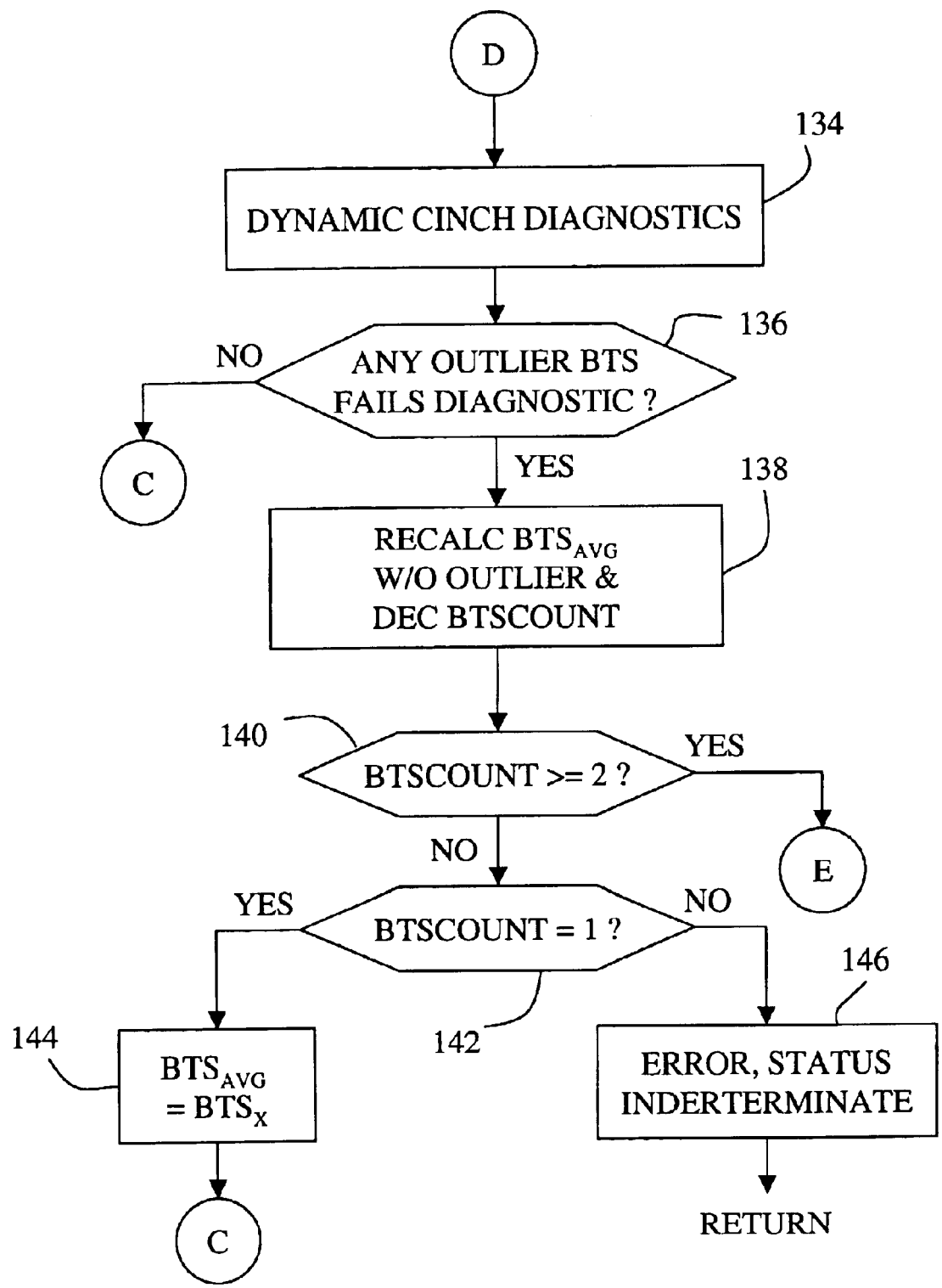

Returning to step 104 in FIG. 5A, if there are any diagnostically faulted sensors or sensors associated with an unlatched belt, the routine removes the corresponding invalid BTS values and decrements BTSCOUNT according to the number of invalid BTS values so removed at step 120. The routine then checks the value of the count at step 122 to see if there are any (valid) BTS values remaining. If there are no BTS values left (BTSCOUNT=0), the routine follows tab B to step 112 of FIG. 5B, wherein the routine sets the NO COMPENSATION flag and exits. But if there is at least one BTS value not faulted (non-zero count), and therefore valid, at step 122, the routine proceeds to step 124, wherein it is determined whether only a valid single BTS value remains. If this is the case, the average seat belt tension value $BTS_{AVG}$ is set equal to the only valid BTS value $BTS_X$ at step 126; and the routine proceeds via tab C to step 132 of FIG. 5B, wherein a compensation value PCOMP is read from a look-up table on the basis of $BTS_{AVG}$. Returning to step 124, if BTSCOUNT is not equal to (that is, if it is greater than) one, the routine proceeds via tab A to step 108 of FIG. 5B and continues as previously described.

Returning to step 118 of FIG. 5B, the routine next advances to step 130, wherein it checks the BTS values remaining against a calibrated tolerance range $BTS_{TOL}$ above and below the average seat belt tension value $BTS_{AVG}$. If all values are within the band (answer YES to the stated condition), the routine proceeds to step 132, wherein the average seat belt tension value $BTS_{AVG}$ is used to look up the compensation value PCOMP as previously described. But if an outlier value is found (answer NO to the stated condition), the routine tests the outlier value at step 134 in a subroutine DYNAMIC CINCH DIAGNOSTICS, described with reference to FIGS. 7A–7C.

Routine DYNAMIC CINCH DIAGNOSTICS begins by determining at step 200 if a belt tension sensor (BTS) or pressure sensor (PS for pressure sensor 46) is faulted. Generally the fault sensing is performed elsewhere, for example by known electrical tests for short or open circuits, etc.; and one or more fault flags are set for fault(s) found. This step thus needs only to check the appropriate flag(s). If a fault is found, routine DYNAMIC CINCH DIAGNOSTICS is exited (via tab N to clear a CDT_IN_PROCESS FLAG at step 240, FIG. 7C). If no fault is found at step 200, the routine continues by checking a CDT_IN_PROCESS flag at step 201, FIG. 7A. If the flag indicates no test in process, the process is initialized by setting the flag to TRUE at step 202 and then resetting software accumulators $ACC_{AC}$, $ACC_{AP}$, $ACC_C$, $ACC_P$, $AVG_C$ and $AVG_P$ to zero as well as setting variables OLD_RAW_CINCH to the value of RAW_CINCH and OLD_RAW_PRESSURE to the value of RAW_PRESSURE at step 204. RAW_CINCH is the signal value (BTS1, BTS2, ... or BTSN) of the selected belt tension sensor 66, 67, etc., and RAW_PRESSURE is the signal value of pressure sensor 46. A Loop Counter is reset by setting $COUNT_K$=zero at step 206. But if the flag indicates at step 200 that the test is already in progress, then initialisation is not desired: and steps 202, 204 and 206 are thus bypassed.

Figure 8:
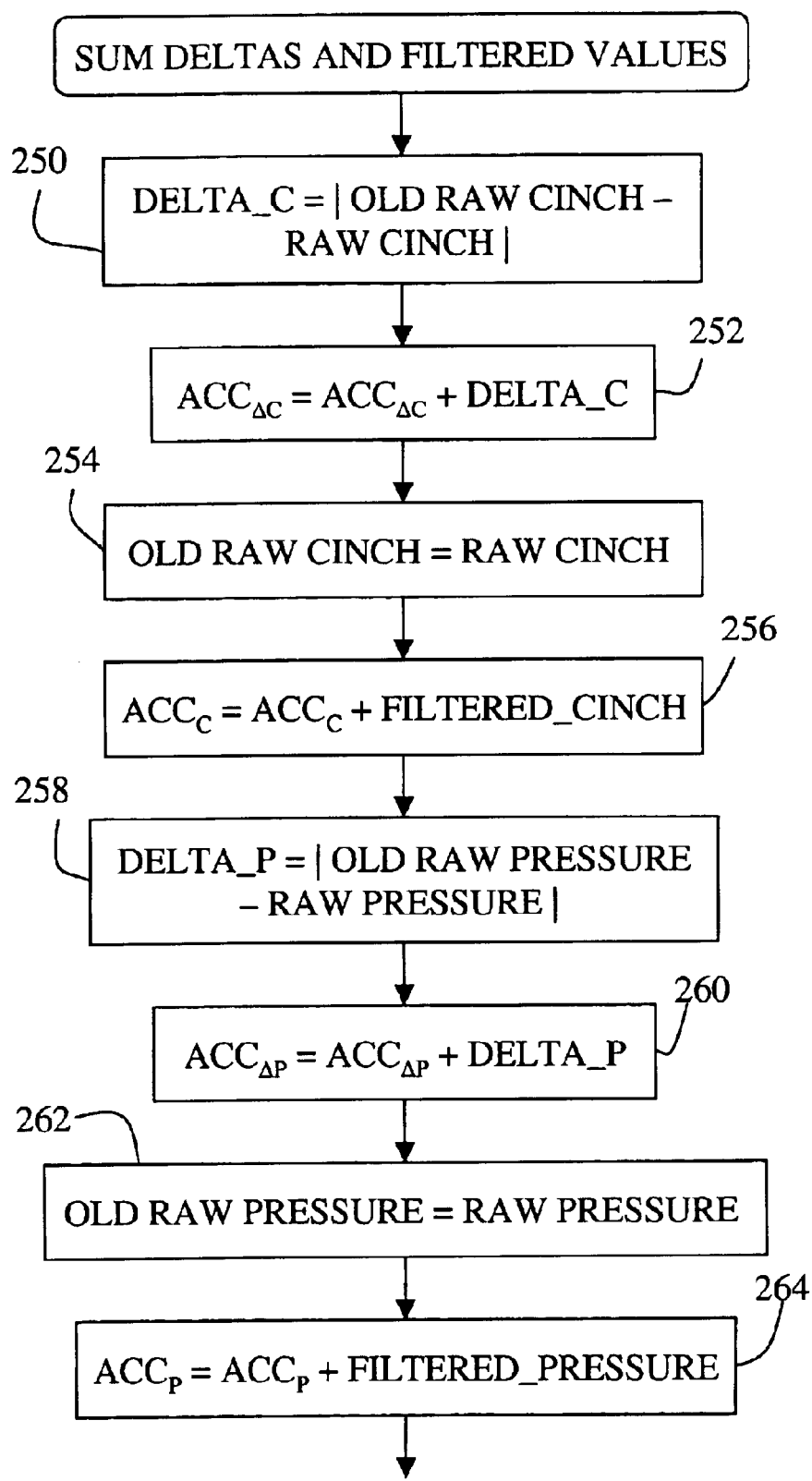

At step 208, the subroutine SUM DELTAS AND FILTERED VALUES of FIG. 8 is called to update the accumulators. Referring to FIG. 8, the subroutine begins at step 250, at which DELTA_C is calculated as the absolute value (unsigned magnitude) of the difference between the input new and stored old values of the RAW_CINCH tension or force. The absolute value is used because the accumulator value $ACC_{AC}$ is a cinch (seat belt tension) force variance measure used to determine the degree of total change over a period of time as the accumulated parameter oscillates in value. At step 252, cinch force variance measure $ACC_{AC}$ is increased by the value of DELTA_C. At step 254, the new value of RAW_CINCH then becomes the old value for the next loop; and $ACC_C$ is increased by the input (signed) value of FILTERED_CINCH at step 256. Steps 258, 260, 262 and 264 perform the same operations in a parallel manner for similar parameters of bladder pressure, wherein $ACC_{AP}$, in particular, is a variance measure of the output of pressure sensor 46.

Upon return from the subroutine, loop count $COUNT_K$ is compared at step 210 with a reference value K_MAX_COUNT. If $COUNT_K$ does not exceed K_MAX_COUNT, $COUNT_K$ is incremented at step 212; and the DYNAMIC CINCH DIAGNOSTICS subroutine is exited (via tab N and step 240 of FIG. 7C) with a return to the main routine. But if $COUNT_K$ exceeds K_MAX_COUNT at step 210, the subroutine proceeds via tab F to step 214 of FIG. 7B and determines $AVG_C=ACC_C/COUNT_K$ and $AVG_P=ACC_P/COUNT_K$, wherein $AVG_C$ and $AVG_P$ are the time-averaged values of RAW_CINCH force and RAW_PRESSURE, respectively and $ACC_C$ and $ACC_P$ are the total accumulated changes in RAW_CINCH force and RAW_PRESSURE, respectively. $COUNT_K$ determines the number of samples, and therefore the total time, used in calculating the values $AVG_C$ and $AVG_P$.

The subroutine next determines at step 216 if $AVG_C$ is within a predetermined cinch force window defined by an upper limit of K_MAX_C and a lower limit of K_MIN_C. This window defines a nominal range of values of $AVG_C$ which are unlikely to be associated with clipping of the value of the input cinch signal and are thus likely to be reliable. If it is within the window, the subroutine next determines at step 218 if $AVG_P$ is within a similar predetermined bladder pressure window determined by limits K_MAX_P and a lower limit of K_MIN_P. If either of the tests of steps 216 and 218 produces a NO response—that is, the time-averaged value is outside the appropriate window, the routine exits via tab N to step 240 since no reliable test can be performed.

If the results of both tests at steps 216 and 218 are YES, the subroutine then performs table look-up operations to determine values of K_DELTA_C at step 220 and K_DELTA_P at step 222, each as functions of both $AVG_C$ and $AVG_P$. From step 222, the subroutine next determines at step 224 if both (a) $ACC_{AP}$ is greater than K_DELTA_P1 and (b) $ACC_{AC}$ is less than K_DELTA_C1. If the answer is yes, then the belt cinch force sensor is not showing oscillations corresponding to the bladder pressure sensor as it should; and the belt may be stuck. Thus, the routine sets the DDF flag to TRUE at step 228. If the answer is no, no such conclusion is made; and the routine next determines at step 226 if both (a) $ACC_{AP}$ is less than K_DELTA_P2 and (b) $ACC_{AC}$ is greater than K_DELTA_C2. If the answer is yes, then the belt cinch force sensor is not agreeing with the bladder pressure sensor as it should. Although this disagreement is less likely caused by a stuck belt, it is nevertheless considered a fault. Thus, the routine sets the DDF flag to TRUE at step 228. If the answer is no at both of steps 224 and 226, the routine sets the DDF flag to FALSE at step 230.

Figure 7A:
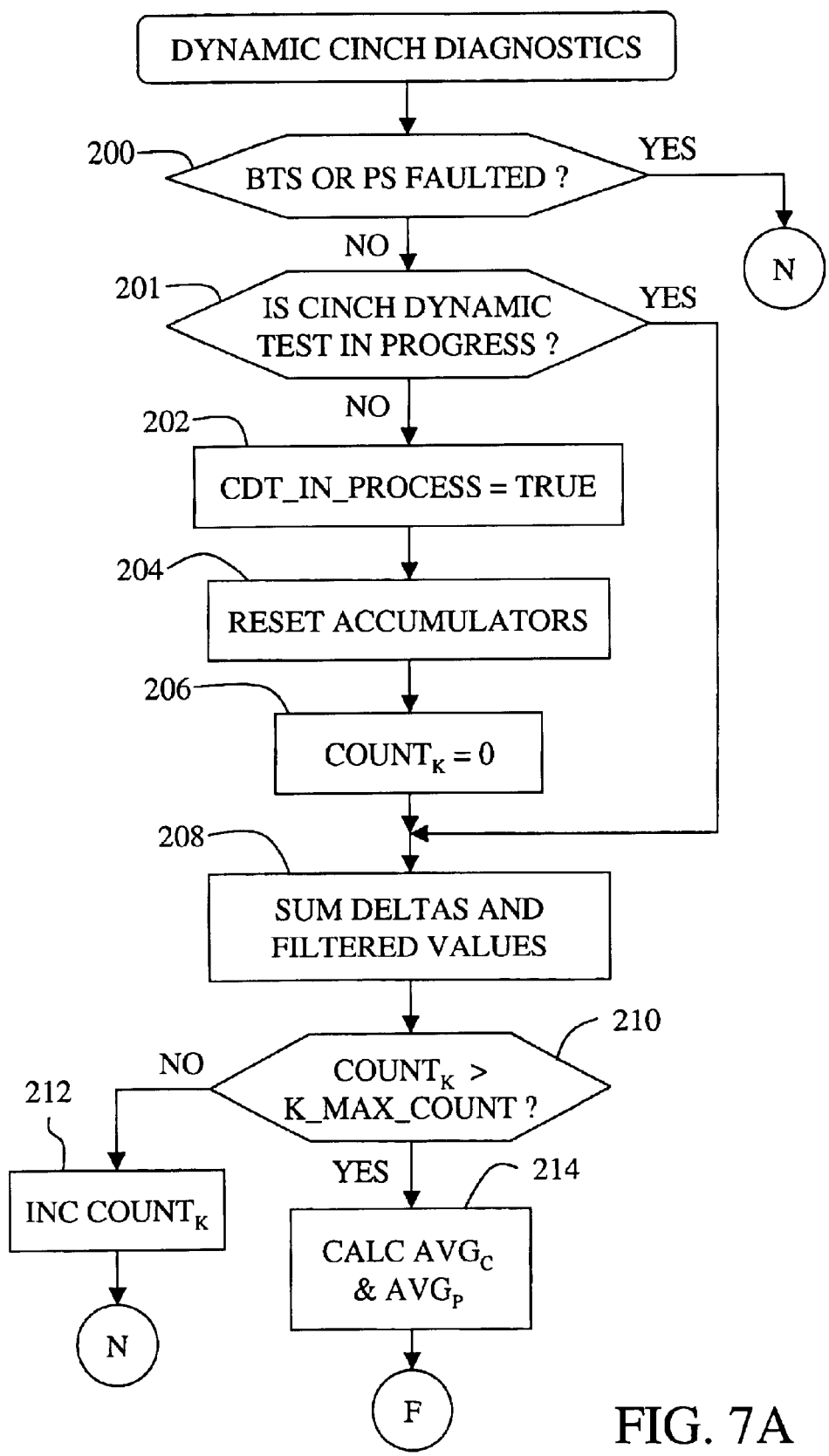
Figure 7B:
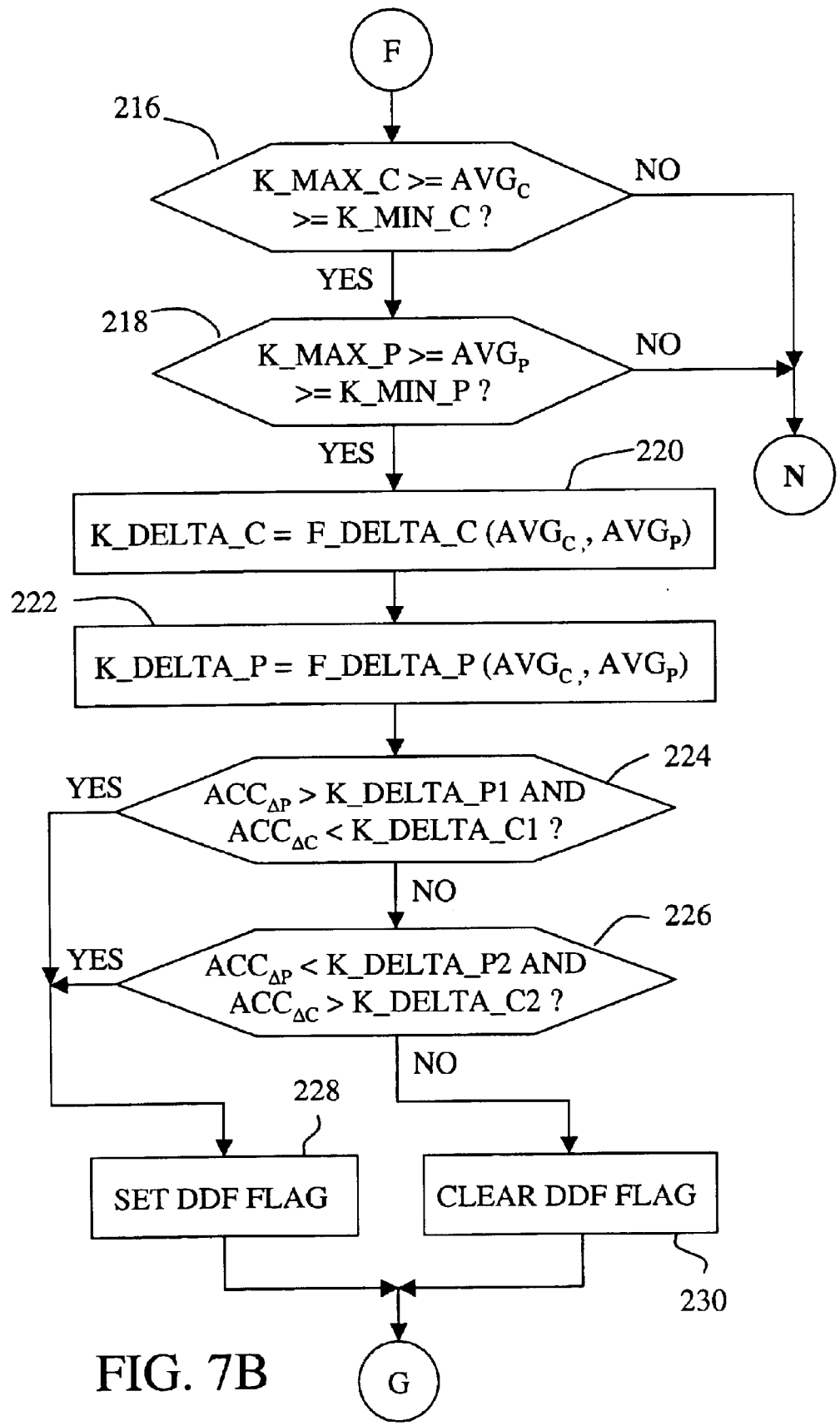
Figure 7C:
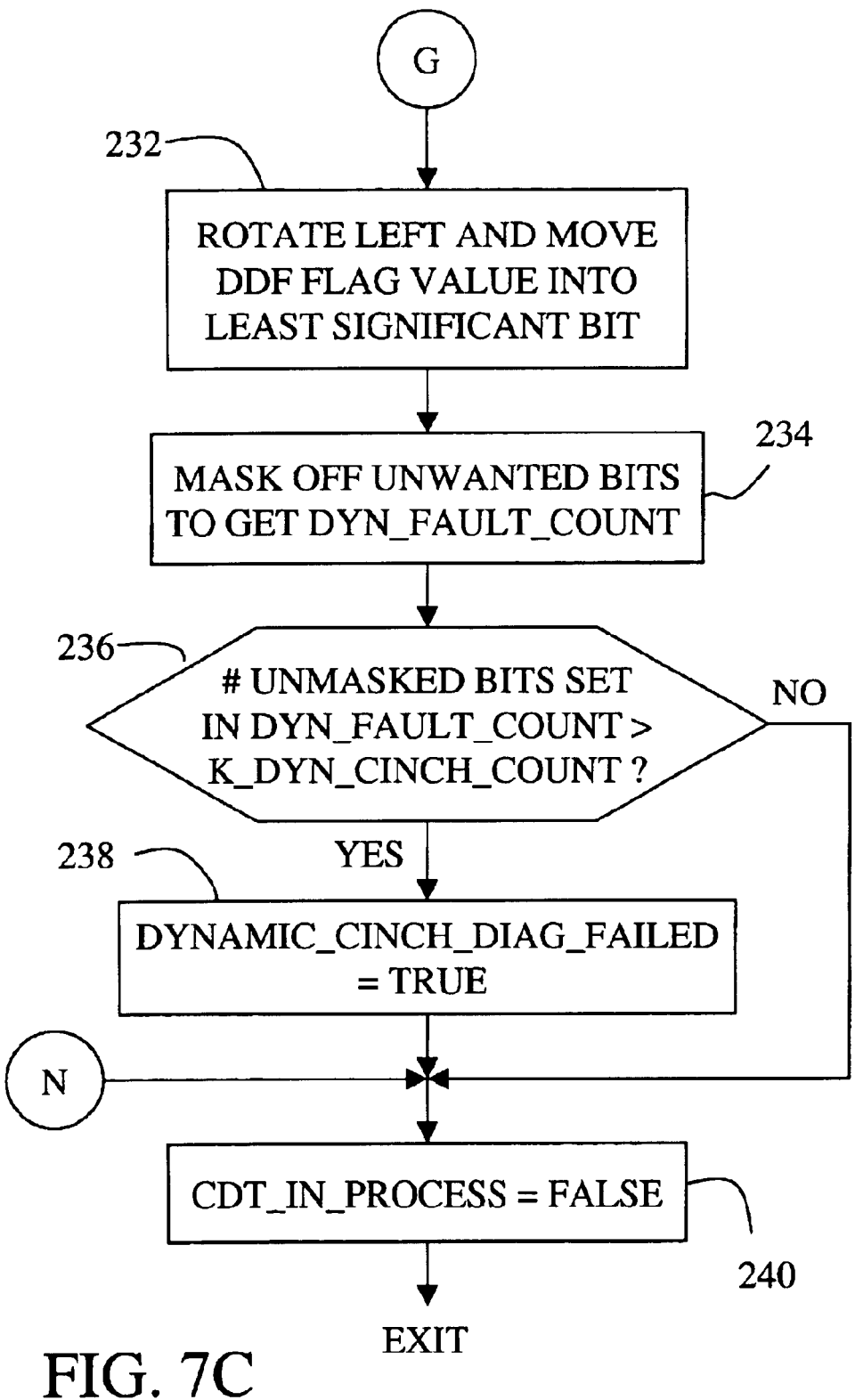

From either of steps 228 or 230, the subroutine proceeds via tab G to step 232 of FIG. 7C. In steps 232 and 234 a byte is created having a predetermined number of bits, each of which indicates a DDF flag value of TRUE (1) or FALSE (0) and therefore provides a short recent history of the test results. For example, each time the DDF flag is set at step 228 or cleared at step 230, at step 232 the appropriate bit value—1 or 0, respectively to indicate (1) failure of the test or (0) absence of failure of the test, due either to passage of the test or inability to complete the test—is inserted at one end of the reduced byte and the bits shifted (rotated) so that the oldest determined bit disappears from the other end. At step 234, a predetermined number of bits (for example, five bits) of the eight bit byte are used by masking off three of the bits (the oldest). The routine then checks the unmasked portion of the byte at step 236 to determine if the number of set bits (DYN_FAULT_COUNT) exceeds a reference count (K_DYN_CINCH_COUNT). If the reference count is 3, for example, the answer will be yes when at least four of five unmasked bits are set, that is to say when 4 of the last 5 DDF flag results were set TRUE. If the answer is yes, a DYNAMIC_CINCH_DIAG_FAILED flag is set TRUE at step 138; the CDT_IN_PROCESS flag is set FALSE at step 240; and the subroutine returns program control to the main routine. But if the number of set bits in the unmasked portion of DYN_FAULT_COUNT does not exceed the reference count K_DYN_CINCH_COUNT at step 236, step 238 is bypassed before the CDT_IN_PROCESS flag is set FALSE at step 240.

Further details and variations of this subroutine are more fully described in previously cited U.S. Provisional Application No. 60/408,039, which is incorporated by reference herein.

Returning to FIG. 5C, from step 134 the routine checks at step 136 whether the outlier value has failed the dynamic oscillation diagnostic test. If it has, it is discarded as invalid at step 138, with BTSCOUNT being decremented by one and the average BTS value being re-calculated without the discarded value. BTSCOUNT is then tested at step 140. If BTSCOUNT is greater than or equal to 2, the routine returns via tab E to step 130 of FIG. 5B to determine if the newly recalculated average is within the tolerance band. But if BTSCOUNT is less than 2 at step 140, BTSCOUNT is tested again at step 142. If it equals 1, the value of $BTS_{AVG}$ is set equal to the one value available $BTS_X$ at step 144; and the routine returns via tab C to step 132 of FIG. 5B for a table look-up of the compensation value PCOMP on the basis of the value of $BTS_{AVG}$. If BTSCOUNT is not equal to 1 at step 142, then the routine proceeds to step 146, wherein an error is flagged and the status is marked INDETERMINATE. From step 146 the routine is exited.

Figure 6:
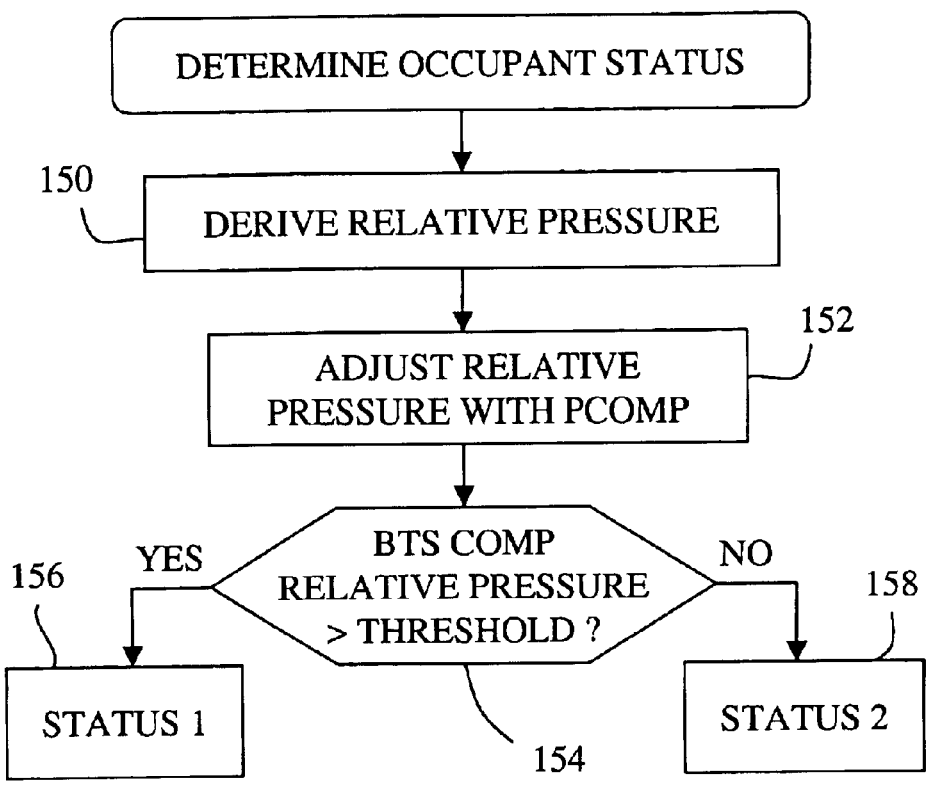

If the routine is exited from step 132 with a value of PCOMP determined, this value of PCOMP is used to compensate a sensed occupant characterizing parameter in an algorithm to determine an occupant status by comparing the occupant characterizing parameter with one or more thresholds. A preferred occupant characterizing parameter is the pressure sensed by pressure sensor 46, which is indicative of the weight of restrained mass 48. For example, some governmental regulations for vehicle passive restraints are written to distinguish between occupants of different weight in determining whether or not, or with what force, to deploy a passive restraint for the occupant of a seat. The use of PCOMP in such an algorithm is shown in routine DETERMINE OCCUPANT STATUS, which is shown in the flow chart of FIG. 6. At step 150, Relative Pressure is determined:

Relative Pressure=Pressure Sensor Output–Comp Empty Seat Pressure, wherein Pressure Sensor Output is the current output signal of the bladder pressure sensor, filtered as desired. Comp Empty Seat Pressure is derived from a stored calibration value that was determined by reading the pressure sensor output in an installed occupant weight determination system under controlled environmental conditions (temperature, humidity), typically at the point of seat or vehicle assembly. The stored calibration value becomes Comp Empty Seat Pressure by compensating it during system use for environmental factors such as temperature and other factors as desired.

At step 152, Relative Pressure is compensated with PCOMP as follows:

BTS Compensated Relative Pressure=Relative Pressure–PCOMP.

The subtraction of PCOMP compensates for the downward component of the tension in belt 50 that affects the output of pressure sensor 46; and, through the method and apparatus of this invention, PCOMP is derived from a set of multiple belt tension sensors in a manner providing an accurate value of belt tension even if one of the sensors provides an invalid output signal due to pinching or kinking of the belt.

The BTS Compensated Relative Pressure value is compared at step 154 to the compensated threshold value Comp Threshold. Comp Threshold is a stored threshold value that is compensated in use for the environmental and other factors mentioned above with reference to Comp Empty Seat Pressure, as appropriate. A first occupant status is declared at step 156 if Relative Pressure is greater than Comp Threshold; otherwise a second occupant status is declared at step 158. The first occupant status may be, for example, that an occupant is present in the seat; and the second occupant status may be, for example, that there is no occupant in the seat. The first occupant status would call for deployment of an airbag in a sensed crashed event, while the second occupant status would suppress deployment. Another example would identify the first occupant status with the presence of a heavy occupant such as an adult male, whereas the second occupant status would signify a light occupant such as a child or a fifth percentile female. In this case, the first occupant status would still provide for deployment of the airbag; but the second occupant status would either suppress deployment or deploy at a lower level. Yet another example would identify the first occupant status as a seated person and the second occupant status as an infant seat and would suppress deployment for the second occupant status.

FIGS. 9A–9D show a flow chart of a routine DYNAMIC CINCH DIAGNOSTICS WITH ACCEL, which is an alternative to the flow chart of FIGS. 7A–7C that further makes use of the signal from accelerometer 9, from which are derived values having a subscript of "A". The routines are similar, and common steps are provided with reference numerals that are identical except for the hundreds digit, with the reference numerals of FIGS. 9A–9D in the 300's. Additional steps in the flow chart of FIGS. 9A–9D have no counterpart in the flow chart of 7A–7C. Due to the great similarity between the flow charts, only the additions of FIGS. 9A–9D will be described in detail.

In the flow chart of FIGS. 9A–9D, routine DYNAMIC CINCH DIAGNOSTICS WITH ACCEL begins at step 300 by determining if accelerometer (ACCEL) 9 is faulted, by whatever known methods are appropriate. This determination may take place in a different routine, with a fault flag set if a fault is determined and the flag checked in step 300 of this routine. If an ACCEL fault is determined, this routine is exited; and the program reverts to the routine DYNAMIC CINCH DIAGNOSTICS previously described with respect to FIGS. 7A–7C. If no such fault is determined at step 300, then acceleration information is available; and this routine proceeds to step 301, in which a BTS or PS fault is determined, for example in the same manner as previously described with respect to step 200 of FIG. 7A. If a BTS or PS fault is determined, this routine is exited via tab J and step 348 in FIG. 9D; but if no such fault is determined, this routine continues with steps 303–312, which are substantially identical to similar steps 200–212 in the flow chart of FIGS. 7A–7C, except that step 305 also resets the additional software accumulators $ACC_{AA}$, $ACC_A$ and $AVG_A$ and sets OLD_RAW_ACCEL=RAW_ACCEL, in addition to the operations shown in step 204 of FIG. 7A; and step 312 produces an exit from the routine via tab J and step 348 of FIG. 9D. Step 314 differs in additionally calculating a time-averaged acceleration value $AVG_A$. Steps 316 and 318 are identical to similar steps 216 and 218; but step 318 is followed by an added step 319, in which the subroutine next determines if $AVG_A$ is within a predetermined acceleration window determined by limits K_MAX_A and a lower limit of K_MIN_A. Only if this is true does the subroutine then perform table look-up operations 320 and 322 corresponding to those of steps 220 and 222 in FIG. 7B. But these table look-ups are different in two ways. First, after steps 320 and 322, in which values of K_DELTA_C and K_DELTA_P are derived, an additional step 323 provides for derivation of K_DELTA_A. And, second, each table look-up is a function of three inputs, including the additional value of $AVG_A$. If the value of $AVG_A$ is not within the window at step 319, the routine exits via tab J to step 348, FIG. 9D, as it similarly will from either of steps 316 or 318 with a similar answer.

Figure 9A:
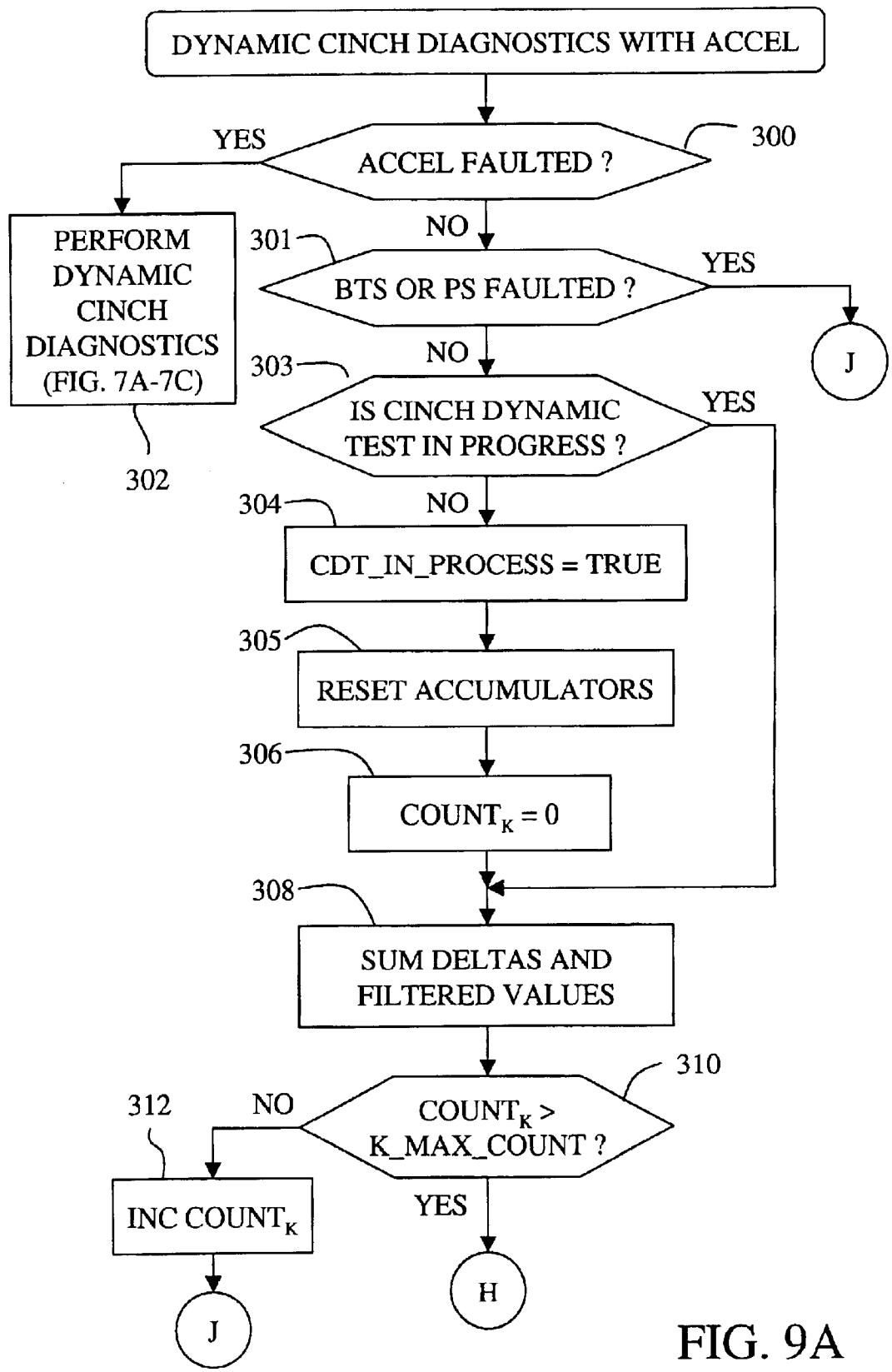
FIGS. 9A–9D and 10 show flow charts illustrating differences in the operation of an alternative embodiment of this invention.
Figure 9B:
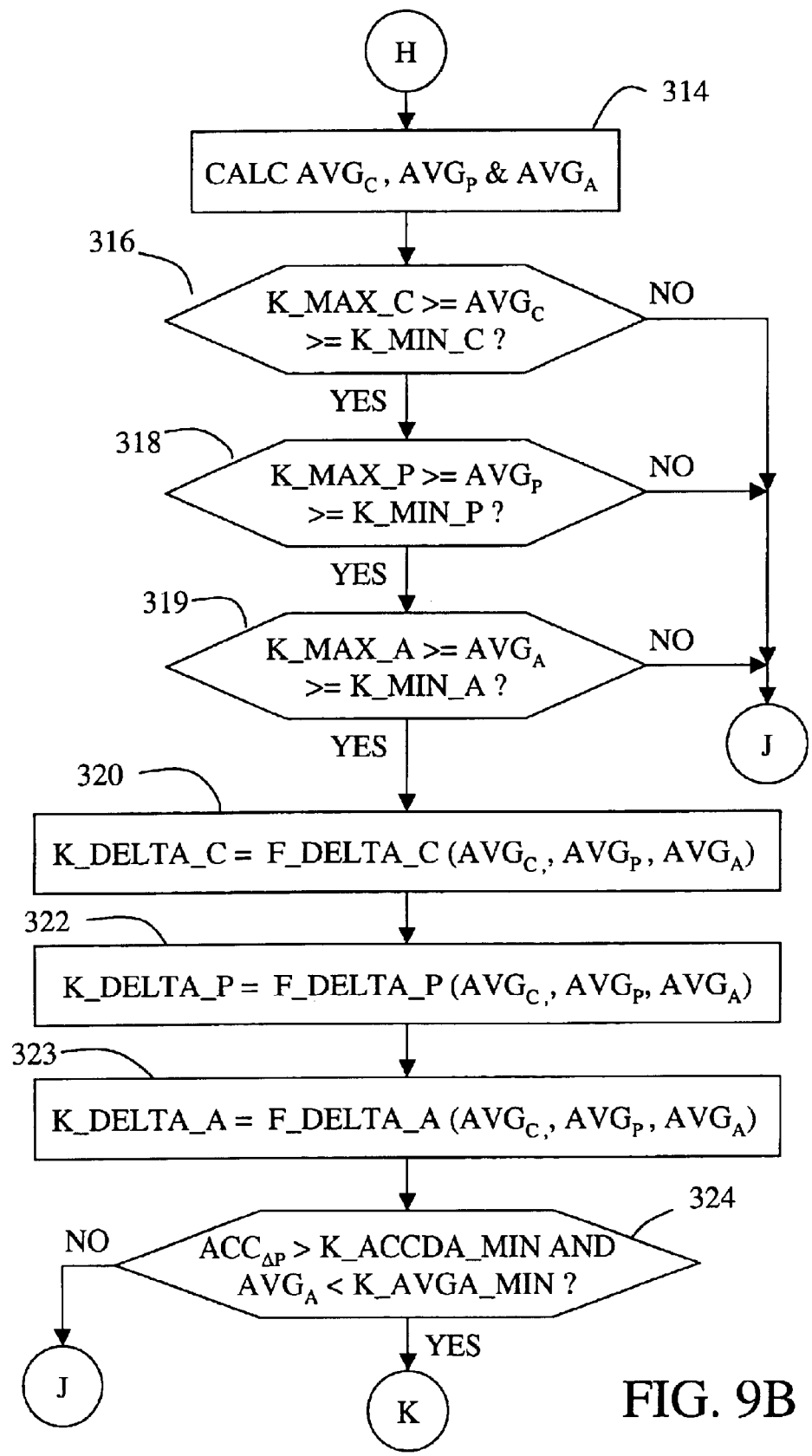
Figure 9C:
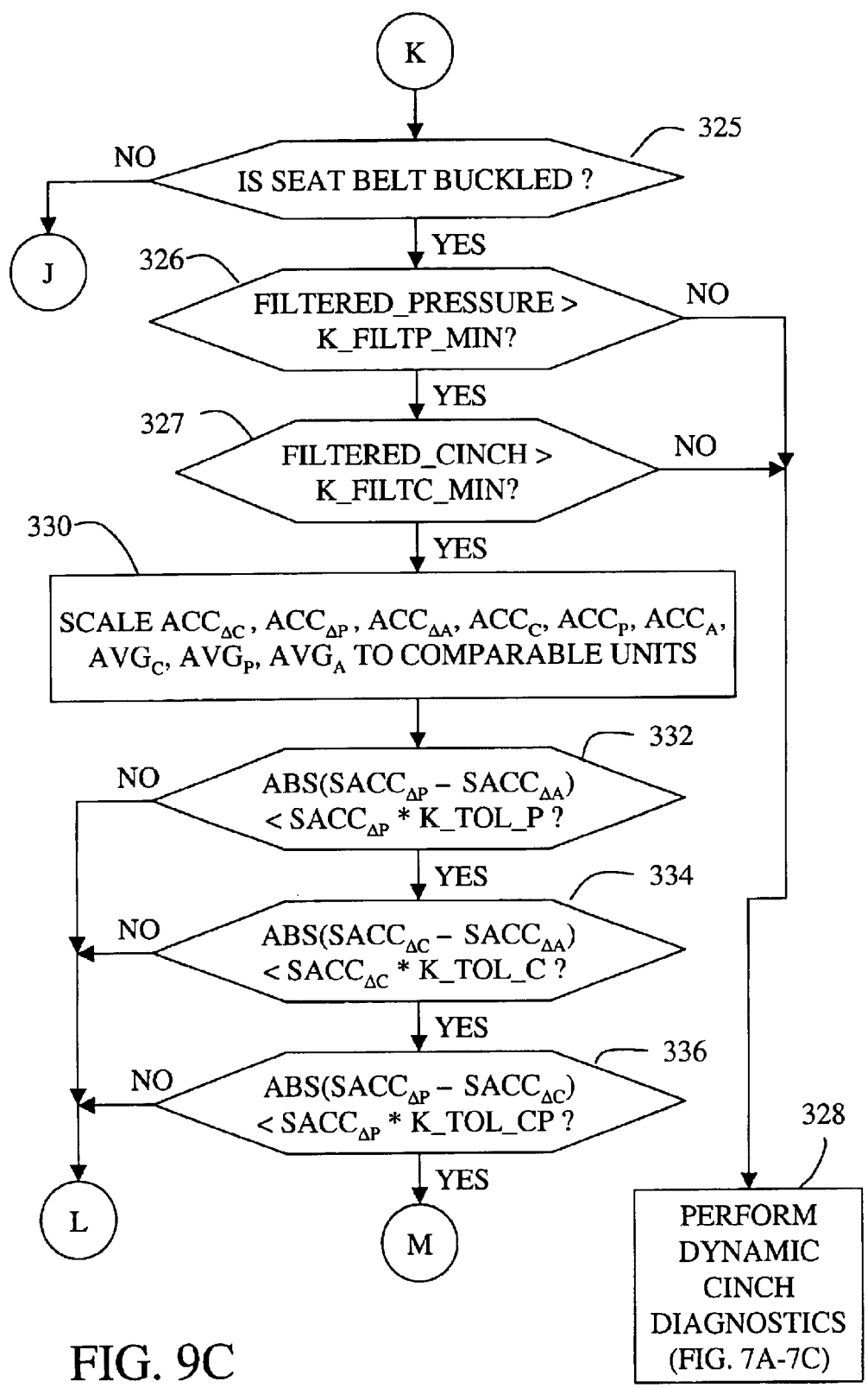

From step 323, the routine proceeds to step 324, wherein it is determined if there is sufficient vertical oscillation to use this routine to provide meaningful results. In this routine, in contrast to the routine of FIGS. 7A–7C, the output of accelerometer 9 is used, since it is the sensor least likely to be compromised by a mechanical obstruction of the belt tension sensor or the pressure sensor (e.g. stuck or kinked belt, blocked pressure inlet, etc.). Step 323 determines if the accumulated accelerometer signal value $ACC_{AA}$ exceeds a threshold value K_ACCDA_MIN and further if the average accelerometer signal value $AVG_{AA}$ exceeds a threshold value K_AVGA_MIN. If either of these is not the case, the routine exits, via tab J and step 348 in FIG. 9D with no reversion to the test of FIGS. 7A–7C (without accelerometer). But if both statements are found to be true at step 324, the routine continues via tab K to step 325 (FIG. 9C). At step 325, the routine determines if seat belt 50 is latched (if a seat belt latch sensor is present to provide this information). If the information indicates the latch 54, 55 is not latched, the routine is exited via tab J and step 348 in FIG. 9D; if a latched condition is indicated (assumed if no latch sensor is present), the routine continues to step 326 at which the filtered pressure signal is compared to a filtered pressure threshold K_FILTP-MIN. If the threshold is exceeded, the routine performs a similar test at step 327 on the filtered cinch signal with respect to a filtered cinch threshold K_FILTC_MIN. The tests of steps 326 and 327 are to determine if either of the filtered pressure or cinch signals are so low that they may be difficult to distinguish from signal noise. If either fails its test, the routine proceeds to step 328 for exit from this routine and reversion to the routine of FIGS. 7A–7C. But if both tests are passed, the routine continues to step 330.

Step 330 is a data processing step preparatory to the tests of the following steps 332, 334 and 336. In these tests the routine compares magnitudes of differences of each pair of the three sensors with a calibrated fraction of the value of one of the sensor values providing the difference. If none of the three differences exceeds the appropriate calibrated fraction, then all three sensors agree with each other within the calibrated tolerance range. Since these steps will combine values from different sensors in mathematical operations and comparisons, it is necessary for meaningful results that the values from the pressure, cinch and acceleration sensors be scaled to comparable levels. At step 330, such scaling takes place for the values of $ACC_{AC}$, $ACC_{AP}$, $ACC_{AA}$ $ACC_C$, $ACC_P$, $ACC_A$ $AVG_C$, $AVG_P$ and $AVG_A$.

After this scaling is complete, the routine determines at step 332 if the absolute value of the difference of the scaled accumulated delta pressure and acceleration values ($SACC_{AP}$–$SACC_{AA}$) exceeds the product of the scaled accumulated delta pressure value ($SACC_{AP}$) and a pressure tolerance factor K_TOL_P, wherein the "S" at the beginning of variable names indicates the scaled value derived at step 330. If it is determined true, then the routine proceeds to the next step 334; but if it is determined not true, the routine proceeds via tab L to step 333 of FIG. 9D, in which the DDF flag is set. Similarly, at step 334, the routine determines if the absolute value of the difference of the scaled accumulated delta cinch and acceleration values ($SACC_{AP}$–$SACC_{AA}$) exceeds the product of the scaled accumulated delta pressure value ($SACC_{AP}$) and a cinch tolerance factor K_TOL_C. If it is determined not true, the routine proceeds to step 334 wherin the DDF flag is set. But if it is determined true, the routine proceeds to step 336, wherein it determines if the absolute value of the difference of the scaled accumulated delta pressure and cinch values ($SACC_{AP}$–$SACC_{AC}$) exceeds the product of the scaled accumulated delta pressure value ($SACC_{AP}$) and a cinch/pressure tolerance factor K_TOL_CP. As in previous steps, if it is determined not true, the routine proceeds to step 334 wherein the DDF flag is set. But from step 336, if it is determined true, the routine proceeds via tab M to step 338 of FIG. 9D, wherein the DDF flag is cleared. In each of these 5 tests, the indicated scaled accumulated delta value multiplied by a tolerance factor could be replaced by either of the other accumulated delta values used in the expressions. The tolerance factors are calibrated constants; and the use of sensor descriptors such as "cinch" or "pressure" is only a naming convention.

Figure 9D:
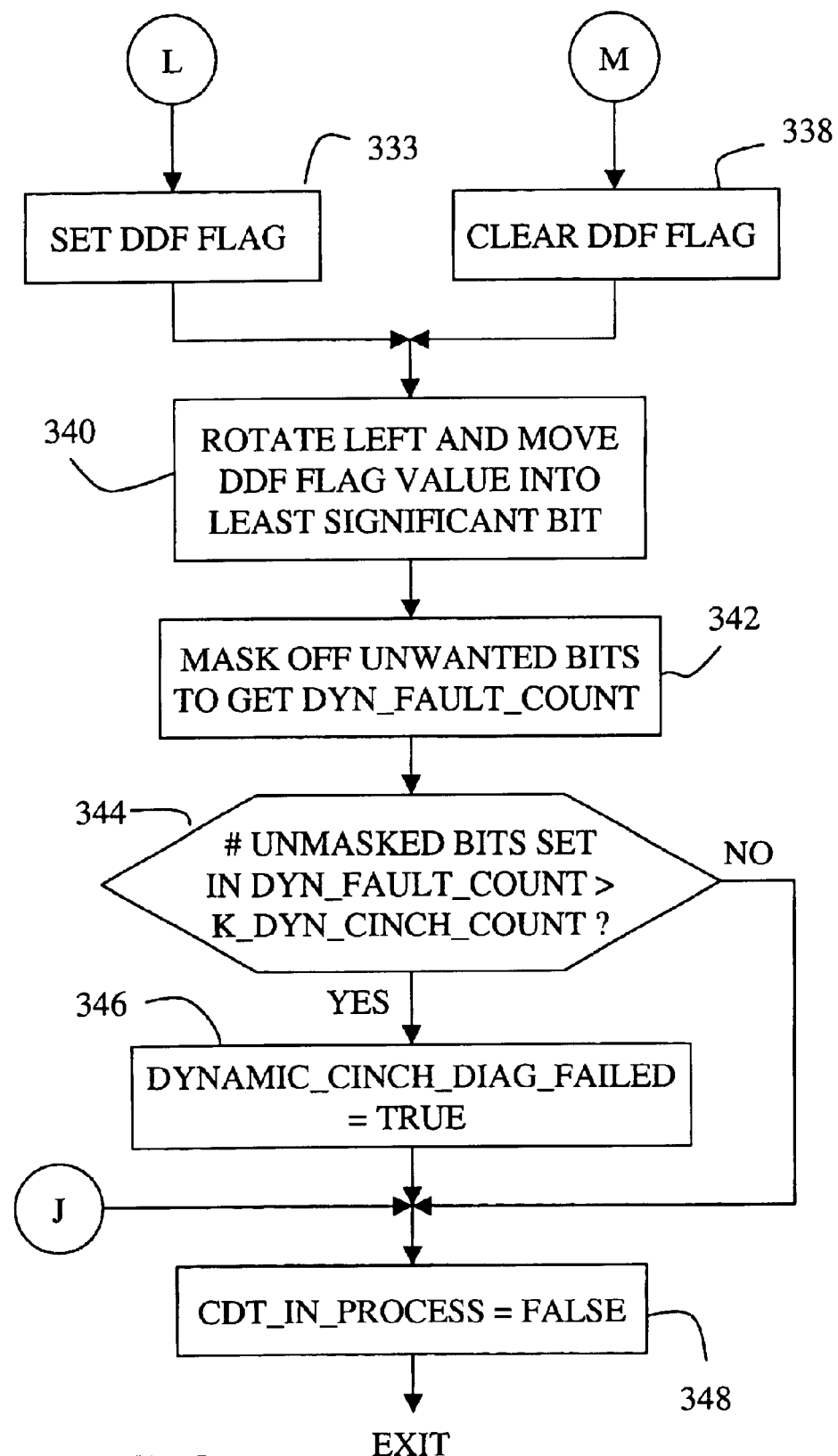

From either of steps 333 and 338 in FIG. 9D, the routine DYNAMIC CINCH DIAGNOSTICS WITH ACCEL proceeds to step 340; and the remainder of the routine, comprising steps 340 through 348, is step-by-step identical with steps 232 through 240 shown in FIG. 7C and described with respect thereto.

Figure 10:
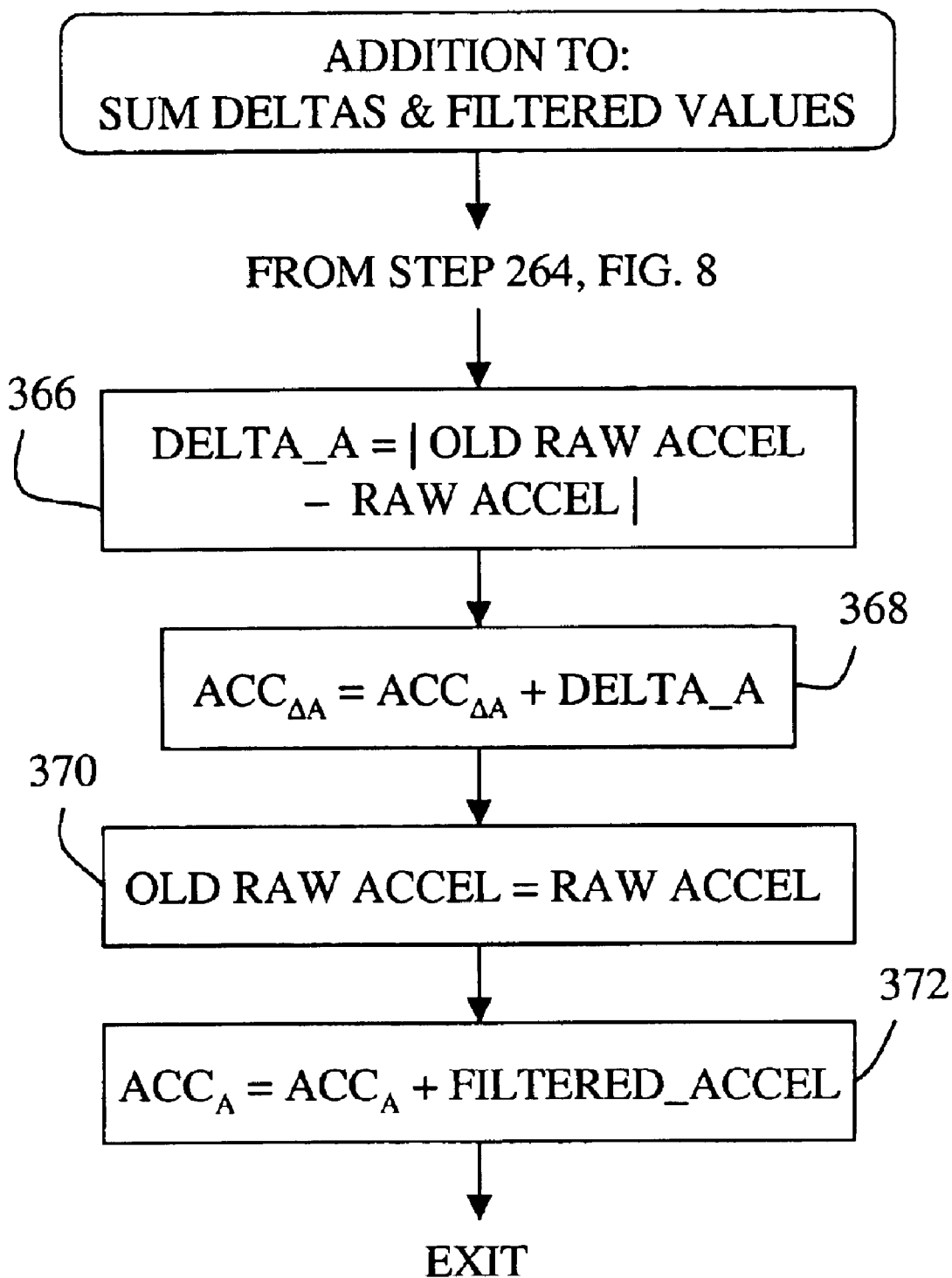

FIG. 10 is a flow chart of an addition to the subroutine SUM DELTAS & FILTERED VALUES, shown in FIG. 8, for use with the routine of FIGS. 9A–9D. The addition begins immediately after step 264 and adds additional steps 366–372, which parallel each of the groups of steps 250–256 and 258–264, but with variables and constants based on acceleration replacing similar variables and constants based on belt tension (CINCH) or on pressure. In particular, $ACC_{AA}$ is a variance measure of the vertical acceleration signal from sensor 9.

What is claimed is:

1. A method of determining a belt tension value in a vehicle seat belt exerting a downward force on a seat occupant, comprising the steps:

receiving a plurality of seat belt tension signals from a plurality of belt tension sensors operatively coupled to the vehicle seat belt at different locations, said seat belt tension signals representing tensile forces in said different locations; and deriving the belt tension value from the plurality of seat belt tension signals, comprising deriving an average seat belt tension value from the plurality of seat belt tension signals; and deriving the belt tension value from the average seat belt tension value.

2. The method of claim 1 wherein the step of deriving an average seat belt tension value further comprises the steps:

distinguishing invalid ones of the plurality of seat belt tension signals from valid ones of the plurality of seat belt tension signals; and deriving the average seat belt tension value only from the valid ones of the plurality of seat belt tension signals.

3. The method of claim 2 wherein the step of distinguishing invalid ones of the plurality of seat belt tension signals from valid ones of the plurality of seat belt tension signals comprises, for a selected one of the plurality of seat belt tension signals:

for a predetermined period, deriving a seat belt tension variance measure and a time-averaged seat belt tension value from the selected one of the plurality of seat belt tension signals;

for the predetermined period, deriving a vertical acceleration variance measure and a time-averaged vertical acceleration value from a received signal indicative of expected vertical acceleration of the seat occupant;

deriving a seat belt tension reference value at least from the time-averaged seat belt tension value and deriving a vertical acceleration reference value at least from the time-averaged vertical acceleration value, the seat belt reference value representing a greater proportionate variance from the time-averaged seat belt tension value than a proportionate variance from the time-averaged vertical acceleration value represented by the vertical acceleration reference value; and determining invalidity of the selected one of the plurality of seat belt tension signals if the seat belt tension signal variance measure exceeds the seat belt tension reference value and the vertical acceleration reference value exceeds the vertical acceleration variance measure.

4. The method of claim 3 wherein the seat belt tension reference value and the vertical acceleration reference value are each derived from both the time-averaged seat belt tension value and the time-averaged vertical acceleration value.

5. The method of claim 3 wherein the seat belt tension variance measure is derived from a sum of absolute values of differences between sampled values of the selected one of the plurality of seat belt tension signals.

6. The method of claim 5 wherein the vertical acceleration measure is derived from a sum of absolute values of differences between sampled values of the received signal indicative of expected vertical acceleration of the seat occupant.

7. The method of claim 3 wherein the step of determining invalidity of the seat belt tension signal is not performed unless the time-averaged seat belt tension value is within a first predetermined range indicating no clipping of the seat belt tension signal during derivation of the seat belt tension variance measure.

8. The method of claim 3 wherein the step of determining invalidity of the seat belt tension signal is not performed unless the time-averaged vertical acceleration value is within a second predetermined range indicating no clipping of the received signal indicative of expected vertical acceleration of the seat occupant during derivation of the vertical acceleration variance measure.

9. The method of claim 3 wherein the seat belt tension reference value is a first seat belt tension reference value and the vertical acceleration value is a first vertical acceleration reference value, the method further comprising the steps:

deriving a second seat belt tension reference value at least from the time-averaged seat belt tension value and deriving a second vertical acceleration reference value at least from the time-averaged vertical acceleration value, the second vertical acceleration reference value representing a proportionate variance from the time-averaged vertical acceleration value greater than a proportionate variance from the time-averaged seat belt tension value represented by the second seat belt tension reference value; and determining invalidity of the seat belt tension signal if the vertical acceleration variance measure exceeds the second vertical acceleration reference value and the seat belt tension reference measure exceeds the second seat belt tension variance measure.

10. The method of claim 3 wherein the received signal indicative of expected vertical acceleration of the seat occupant represents a weight of an occupant on the seat.

11. The method of claim 10 wherein the received signal indicative of expected vertical acceleration of the seat occupant represents a fluid pressure in a fluid filled bladder disposed in the seat below an occupant thereof.

12. The method of claim 3 wherein the received signal indicative of expected vertical acceleration of the seat occupant represents vertical acceleration of the vehicle seat.

13. Apparatus for determining a belt tension value in a vehicle seat belt exerting a downward force on a seat occupant, comprising:

a plurality of belt tension sensors operatively coupled to a seat belt at different locations thereof;

means for receiving a plurality of seat belt tension signals from said belt tension sensors representing tensile forces in said different locations within a the seat belt; and means for deriving the belt tension value from the plurality of seat belt tension signals, comprising means for deriving an average seat belt tension value from the plurality of seat belt tension signals; and means for deriving the belt tension value from the average seat belt tension value.

14. The apparatus of claim 13 wherein the means for deriving an average seat belt tension value further comprise:

means for distinguishing invalid ones of the plurality of seat belt tension signals from valid ones of the plurality of seat belt tension signals; and means for deriving the average seat belt tension value only from the valid ones of the plurality of seat belt tension signals.

15. The apparatus of claim 14 wherein the means for distinguishing invalid ones of the plurality of seat belt tension signals from valid ones of the plurality of seat belt tension signals comprise:

means for selecting one of the plurality of seat belt tension signals;

means for deriving, for a predetermined period, a seat belt tension variance measure and a time-averaged seat belt tension value from the selected one of the plurality of seat belt tension signals;

means for deriving, for the predetermined period, a vertical acceleration variance measure and a time-averaged vertical acceleration value from a received signal indicative of expected vertical acceleration of the seat occupant;

means for deriving a seat belt tension reference value at least from the time-averaged seat belt tension value and deriving a vertical acceleration reference value at least from the time-averaged vertical acceleration value, the seat belt reference value representing a greater proportionate variance from the time-averaged seat belt tension value than a proportionate variance from the time-averaged vertical acceleration value represented by the vertical acceleration reference value; and means for determining invalidity of the selected one of the plurality of seat belt tension signals if the seat belt tension signal variance measure exceeds the seat belt tension reference value and the vertical acceleration reference value exceeds the vertical acceleration variance measure.

16. The apparatus of claim 15 wherein the seat belt tension reference value and the vertical acceleration reference value are each derived from both the time-averaged seat belt tension value and the time-averaged vertical acceleration value.

17. The apparatus of claim 15 wherein the seat belt tension variance measure is derived from a sum of absolute values of differences between sampled values of the selected one of the plurality of seat belt tension signals.

18. The apparatus of claim 17 wherein the vertical acceleration measure is derived from a sum of absolute values of differences between sampled values of the received signal indicative of expected vertical acceleration of the seat occupant.

19. The apparatus of claim 15 wherein the means for determining invalidity of the seat belt tension signal do not perform this function unless the time-averaged seat belt tension value is within a first predetermined range indicating no clipping of the seat belt tension signal during derivation of the seat belt tension variance measure.

20. The apparatus of claim 15 wherein the means for determining invalidity of the seat belt tension signal do not perform this function unless the time-averaged vertical acceleration value is within a second predetermined range indicating no clipping of the received signal indicative of expected vertical acceleration of the seat occupant during derivation of the vertical acceleration variance measure.

21. The apparatus of claim 15 wherein the seat belt tension reference value is a first seat belt tension reference value and the vertical acceleration value is a first vertical acceleration reference value, the apparatus further comprising:

means for deriving a second seat belt tension reference value at least from the time-averaged seat belt tension value and deriving a second vertical acceleration reference value at least from the time-averaged vertical acceleration value, the second vertical acceleration reference value representing a proportionate variance from the time-averaged vertical acceleration value greater than a proportionate variance from the time-averaged seat belt tension value represented by the second seat belt tension reference value; and means for determining invalidity of the seat belt tension signal if the vertical acceleration variance measure exceeds the second vertical acceleration reference value and the seat belt tension reference measure exceeds the second seat belt tension variance measure.

22. The apparatus of claim 15 wherein the received signal indicative of expected vertical acceleration of the seat occupant represents a weight of an occupant on the seat.

23. The method of claim 22 wherein the received signal indicative of expected vertical acceleration of the seat occupant represents a fluid pressure in a fluid filled bladder disposed in the seat below an occupant thereof.

24. The method of claim 15 wherein the received signal indicative of expected vertical acceleration of the seat occupant represents vertical acceleration of the vehicle seat.

25. Apparatus for characterizing an occupant of a vehicle seat, the apparatus comprising:

a seat belt disposed in association with the vehicle seat for restraint of the occupant;

a plurality of belt tension sensors providing seat belt tension signals at different points of the seat belt;

a weight sensor disposed on the vehicle seat and responsive to the downward force exerted by the seat occupant as well as a downward force exerted by tension in the vehicle seat belt through the vehicle occupant; and means for deriving a belt tension value from the plurality of seat belt tension signals; said means for deriving the belt tension value comprising means for characterizing the occupant responsive to a signal from the weight sensor and the belt tension value means for deriving an average seat belt tension value from the seat belt tension signals; and means for deriving the belt tension value from the average seat belt tension value.

26. The apparatus of claim 25 wherein the means for deriving an average seat belt tension value further comprise:

means for distinguishing invalid ones of the seat belt tension signals from valid ones of the seat belt tension signals; and means for deriving the average seat belt tension value only from the valid ones of the seat belt tension signals.

27. The apparatus of claim 26 wherein the means for distinguishing invalid ones of the seat belt tension signals from valid ones of the seat belt tension signals comprise:

means for selecting one of the seat belt tension signals;

means for deriving, for a predetermined period, a seat belt tension variance measure and a time-averaged seat belt tension value from the selected one of the seat belt tension signals;

means for deriving, for the predetermined period, a vertical acceleration variance measure and a time-averaged vertical acceleration value from a received signal indicative of expected vertical acceleration of the seat occupant;

means for deriving a seat belt tension reference value at least from the time-averaged seat belt tension value and deriving a vertical acceleration reference value at least from the time-averaged vertical acceleration value, the seat belt reference value representing a greater proportionate variance from the time-averaged seat belt tension value than a proportionate variance from the time-averaged vertical acceleration value represented by the vertical acceleration reference value; and means for determining invalidity of the selected one of the plurality of seat belt tension signals if the seat belt tension signal variance measure exceeds the seat belt tension reference value and the vertical acceleration reference value exceeds the vertical acceleration variance measure.

28. The apparatus of claim 27 wherein the seat belt tension reference value and the vertical acceleration reference value are each derived from both the time-averaged seat belt tension value and the time-averaged vertical acceleration value.

29. The apparatus of claim 27 wherein the seat belt tension variance measure is derived from a sum of absolute values of differences between sampled values of the selected one of the seat belt tension signals.

30. The apparatus of claim 29 wherein the vertical acceleration measure is derived from a sum of absolute values of differences between sampled values of the received signal indicative of expected vertical acceleration of the seat occupant.

31. The apparatus of claim 27 wherein the seat belt tension reference value is a first seat belt tension reference value and the vertical acceleration value is a first vertical acceleration reference value, the apparatus further comprising:

means for deriving a second seat belt tension reference value at least from the time-averaged seat belt tension value and deriving a second vertical acceleration reference value at least from the time-averaged vertical acceleration value, the second vertical acceleration reference, value representing a proportionate variance from the time-averaged vertical acceleration value greater than a proportionate variance from the time-averaged seat belt tension value represented by the second seat belt tension reference value; and means for determining invalidity of the seat belt tension signal if the vertical acceleration variance measure exceeds the second vertical acceleration reference value and the seat belt tension reference measure exceeds the second seat belt tension variance measure.

32. The apparatus of claim 27 wherein the occupant weight sensor provides the received signal indicative of expected vertical acceleration of the seat occupant.

33. The apparatus of claim 32 wherein the occupant weight sensor comprises a fluid filled bladder disposed in the seat below an occupant thereof and the received signal indicative of expected vertical acceleration of the seat occupant indicates a fluid pressure in the fluid filled bladder.

34. The apparatus of claim 27 wherein an accelerometer fixed with respect to the vehicle seat provides the received signal indicative of expected vertical acceleration of the seat occupant.

35. A method of determining tension in a vehicle seat belt comprising the steps:

providing a plurality of seat belt tension sensors distributed at different locations along the seat belt;

reading tension signals from the plurality of seat belt tension sensors;

calculating an average tension signal from ones of the tension signals presumed to be valid;

identifying an outlier one of the tension signals outside a calibrated tolerance band around the average tension signal;

testing the identified outlier one of the tension signals for valid dynamic variance during vehicle motion;

if the outlier one of the tension signals fails the test, recalculating the average tension signal without the identified outlier one of the tension signals;

repeating the identifying, testing and recalculating steps until all outlier ones of the tension signals failing the test are eliminated and a final recalculated average tension signal is obtained; and providing the final recalculated average tension signal as the determined tension in the vehicle seat belt.

36. The method of claim 35 wherein the step of testing the identified outlier one of the tension signals for valid dynamic variance during vehicle motion comprises the following steps:

for a predetermined period, deriving a seat belt tension variance measure and a time-averaged seat belt tension value from the identified outlier one of the plurality of seat belt tension signals;

for the predetermined period, deriving a vertical acceleration variance measure and a time-averaged vertical acceleration value from a received signal indicative of expected vertical acceleration of an occupant restrained by the seat belt;

deriving a seat belt tension reference value at least from the time-averaged seat belt tension value and deriving a vertical acceleration reference value at least from the time-averaged vertical acceleration value, the seat belt reference value representing a greater proportionate variance from the time-averaged seat belt tension value than a proportionate variance from the time-averaged vertical acceleration value represented by the vertical acceleration reference value; and declaring failure of the test if the seat belt tension signal variance measure exceeds the seat belt tension reference value and the vertical acceleration reference value exceeds the vertical acceleration variance measure.

* * * * *